(12) United States Patent
Moore

(10) Patent No.: US 6,453,932 B2
(45) Date of Patent: Sep. 24, 2002

(54) IN-LINE VALVE

(75) Inventor: Scott E. Moore, Meridian, ID (US)

(73) Assignee: Micron Technology, inc., Boise, ID (US)

(*) Notice: Subject to any disclaimer, the term of this patent is extended or adjusted under 35 U.S.C. 154(b) by 0 days.

(21) Appl. No.: 09/800,534

(22) Filed: Mar. 6, 2001

Related U.S. Application Data

(62) Division of application No. 09/382,549, filed on Aug. 25, 1999, now Pat. No. 6,213,144.

(51) Int. Cl.[7] .................................................. F16K 1/12
(52) U.S. Cl. ......................... 137/219; 137/312; 251/31
(58) Field of Search ................................ 137/219, 312; 251/31

(56) References Cited

U.S. PATENT DOCUMENTS

| | | | |
|---|---|---|---|
| 3,265,084 A | 8/1966 | Wagner | 137/508 |
| 3,534,763 A * | 10/1970 | Locardie | 137/219 |
| 3,587,156 A | 6/1971 | Sorenson | 137/625.66 X |
| 4,116,212 A | 9/1978 | Cooper | 137/508 X |
| 4,117,859 A * | 10/1978 | Illy | 137/219 |
| 4,137,933 A | 2/1979 | Culpepper | 137/219 |
| 5,407,329 A | 4/1995 | Bueser et al. | 137/508 X |
| 5,715,857 A | 2/1998 | Gill | 137/508 X |
| 6,202,671 B1 * | 3/2001 | Horstmann | 137/219 |

FOREIGN PATENT DOCUMENTS

EP          0 566 543       10/1993        ................. 137/219

* cited by examiner

Primary Examiner—Gerald A. Michalsky
(74) Attorney, Agent, or Firm—Knobbe Martens Olson & Bear LLP

(57) ABSTRACT

A flow control valve is made from a one-piece housing which defines a substantially linear flow path. The housing comprises deformable portions coupled to a valve seat and a poppet to allow relative motion therebetween for opening and closing the valve. The deformable portion may comprise a thinned section of a side wall of the housing.

6 Claims, 6 Drawing Sheets

IN-LINE VALVE

CROSS REFERENCE TO RELATED APPLICATION

This application is a divisional of U.S. patent application Ser. No. 09/382,549 entitled "IN-LINE VALVE" and filed on Aug. 25, 1999, now U.S. Pat. No. 6,213,144. The disclosure of the above-described issued patent is hereby incorporated by reference in its entirety.

BACKGROUND OF THE INVENTION

1. Field of the Invention

The invention relates to flow valves. More particularly, the invention relates to valves for use in applications where high purity and low turbulence fluid flow is desirable.

2. Description of the Related Art

In many industrial applications, the control of fluid flow is necessary, and a wide variety of valve designs for performing this control are well known. In some applications, the dispensing of well controlled volumes of pure chemical reagents in liquid or gaseous form is required. Such applications include chemical and pharmaceutical processing, semiconductor manufacture, as well as many others. In these applications, low turbulence and minimal contamination in the fluid distribution process are significant concerns.

Currently available valves, however, generally include internal seals, non-linear flow pathways, and other features that increase the potential for contamination and turbulence. Although a linear fluid path valve without internal seals is described in U.S. Pat. No. 5,848,780 to Miller et al., this valve includes a large number of parts, and requires magnetized metallic elements in the fluid flow stream. Thus, the Miller et al. valve design results in a high manufacturing cost, increased maintenance, and internal components which may be incompatible with the fluid in the valve. Accordingly, what is needed in the art are fluid flow valves which are inexpensive to manufacture, which allow low turbulence flow, and which are less susceptible to leakage or contamination of the flowing fluid.

SUMMARY OF THE INVENTION

In one embodiment, the invention comprises a fluid flow valve including a one-piece housing defining a substantially linear fluid flow path. The one-piece housing comprises a central portion coupled on each side by one or more deformable segments, coupled to end portions so as to allow relative motion therebetween. A poppet is attached to one of the end portions and positioned in the linear fluid flow path such that the central portion abuts the poppet to stop fluid flow through the valve when the central portion is moved toward one of the end portions. One or more sleeves surround the housing and isolate the air surrounding the deformable segments from ambient conditions.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
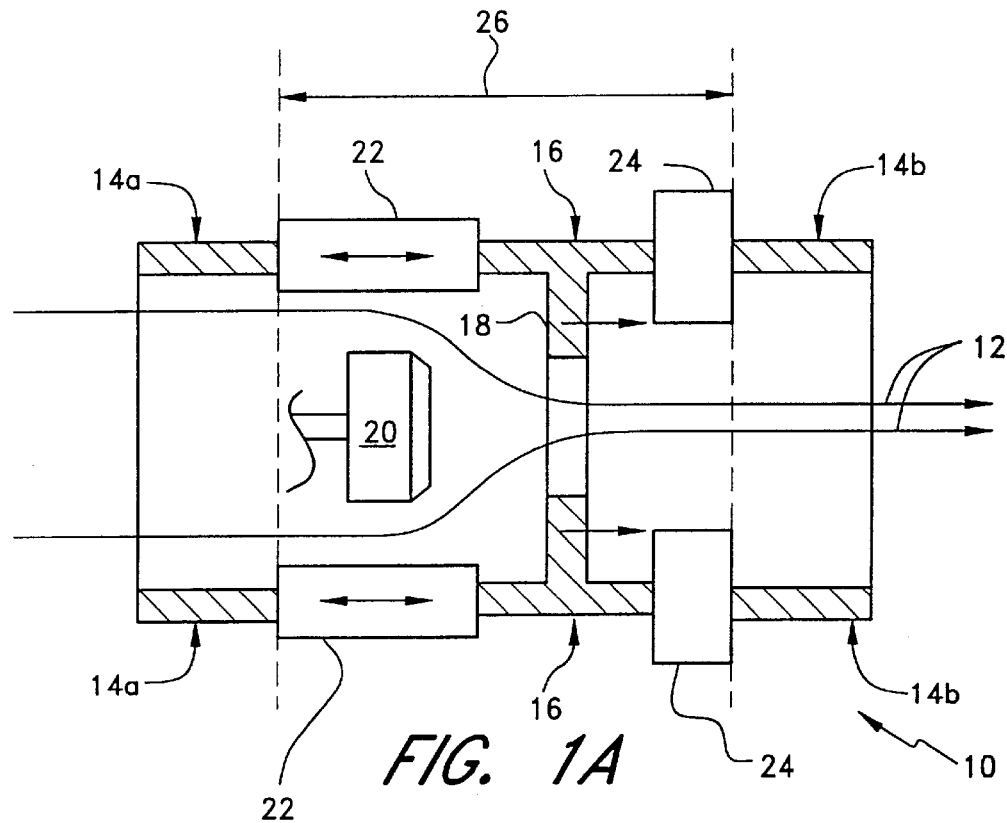
FIG. 1A is a longitudinal cross section of a valve in an open configuration comprising a poppet, valve seat, and housing in accordance with the invention.
Figure 1B:
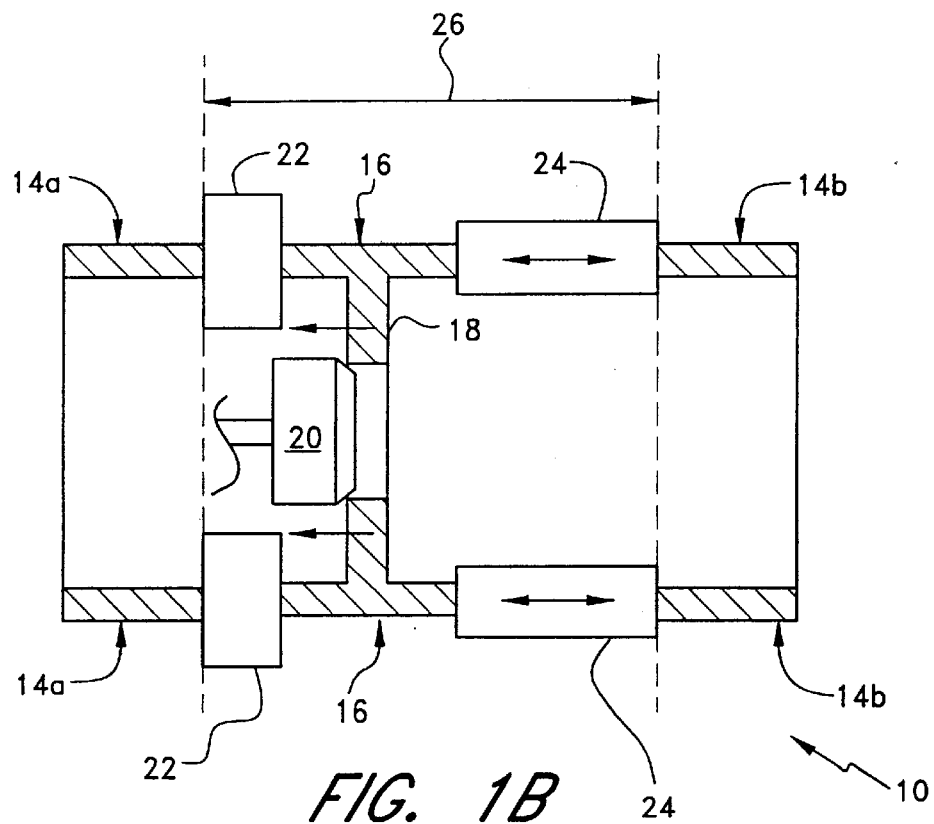
FIG. 1B is a longitudinal cross section of the valve of FIG. 1A showing the valve in a closed configuration.

Referring now to FIGS. 1A and 1B, a valve according to one embodiment of the invention is illustrated in longitudinal cross section, in a manner illustrating some principles of operation of the invention. The valve 10 comprises a housing defining a substantially linearly extending flow pathway designated by arrows 12. The housing comprises end portions 14a, 14b and a central portion 16. The central portion 16 may advantageously comprise a valve seat 18, which, as shown in FIGS. 1A and 1B, may be integral to the central portion 16 of the housing itself. Also provided in the valve 10 is a poppet 20, which may advantageously be fixed to or integral with one of the end portions 14a, 14b, although this coupling is not illustrated in FIG. 1A or 1B for clarity of illustration.

The central portion 16 of the housing may be coupled to each end portion 14a, 14b via deformable housing portions 22, 24. These portions are advantageously both expandable and contractible from their equilibrium state. Thus, if the end portions 14a, 14b are held at a fixed separation distance from each other, as indicated by the arrow 26 of FIGS. 1A and 1B, the central portion 16 of the housing will be movable along the longitudinal axis of the valve between the two end portions 14a, 14b. Thus, FIG. 1A illustrates the left deformable portion 22 in an expanded state, and the right deformable portion 24 in a contracted state, whereby the valve seat 18 on the central portion 16 is moved to the right and away from the poppet 20. In FIG. 1B, the right deformable portion 24 is in an expanded state, and the left deformable portion 22 is in a contracted state, whereby the valve seat 18 on the central portion 16 is moved to the left to engage the poppet 20. Because the poppet 20 is fixed relative to the end portions 14a, 14b of the valve, it remains stationary as the valve seat engages to and disengages from it in response to the motion of the central region 16 and the alternative deformation of the deformable regions 22, 24. FIG. 1A therefore illustrates the valve in the open configuration, and FIG. 1B illustrates the valve in the closed configuration. Although embodiments having a movable valve seat and stationary poppet include some advantages in manufacturability, it will be appreciated that in the alternative, the poppet 20 could be fixed to the moveable central portion 16 and the valve seat 18 fixed to the end portion while still providing the same fluid flow control.

Figure 2:
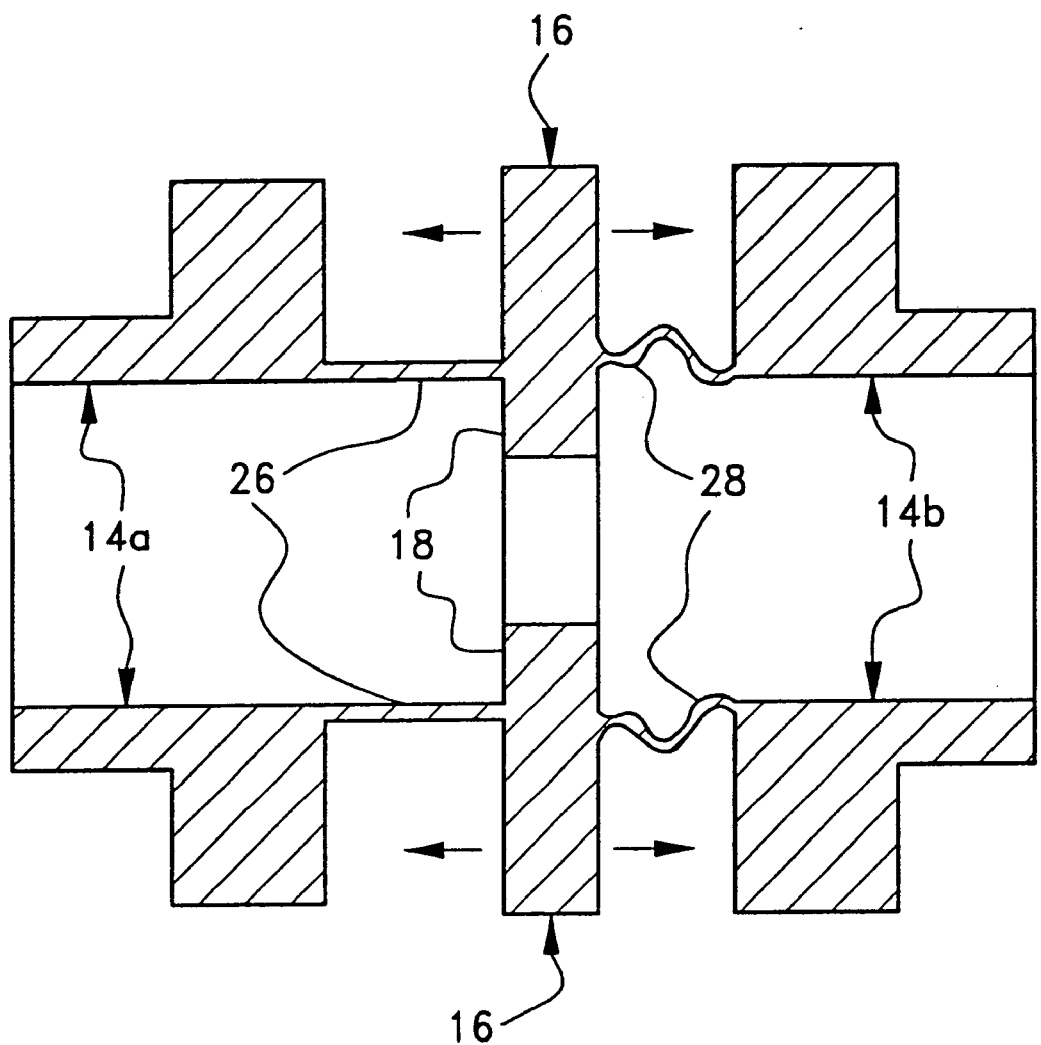
FIG. 2 is a longitudinal cross section of a one piece valve housing with integral deformable portions.

In some embodiments of the invention, the end portions, central portion, and deformable portions of the valve constitute a one-piece housing which comprises a seal-free contiguous piece of material. In many cases, such a one-piece housing may be formed by machining or molding a solid polymer into the desired configuration. Another alternative method is welding together separate metal housing components. One suitable housing of this nature is illustrated in FIG. 2. Referring now to this Figure, the deformable portions of the housing comprise thinned sections 26 and 28 of the side wall of the valve housing provided on each side of the central region 16. Motion of the central region 16 along the longitudinal fluid flow path thus results in a differential buckling or pleating of the thinned regions 22, 24. In FIG. 2, the central region 16 has been moved rightward, causing a buckling of the right thinned section 28 and a straightening of the left thinned section 26 on the opposite side of the central region 16. It will be appreciated that the central region 16 could also be moved leftward, thereby straightening the right thinned section 28 and buckling the left thinned section 26.

The valve housing of FIG. 2 can be manufactured from a wide variety of materials, including various metals, ceramics, or plastics. A fluoropolymer such as polytetrafluoroethylene (PTFE or TEFLON®) is one especially suitable material because of its low reactivity and relative flexibility. The housing can be machined from solid or tubular stock material. It can also be cast, injection or vacuum molded, or formed in other well known material processing procedures. In some embodiments, different materials may be used for different portions of the housing. For example, multi-part injection molding techniques may be used to produce a valve body with different materials for the deformable portions of the housing than for the remainder of the housing. This technique could be used to produce a housing having elastomeric deformable portions while the remainder of the housing is formed from more rigid material. In this embodiment, the deformable regions need not be made as thin, because the material itself will be stretchable. Many alternative production methods will be apparent to those of skill in the art.

Figure 3:
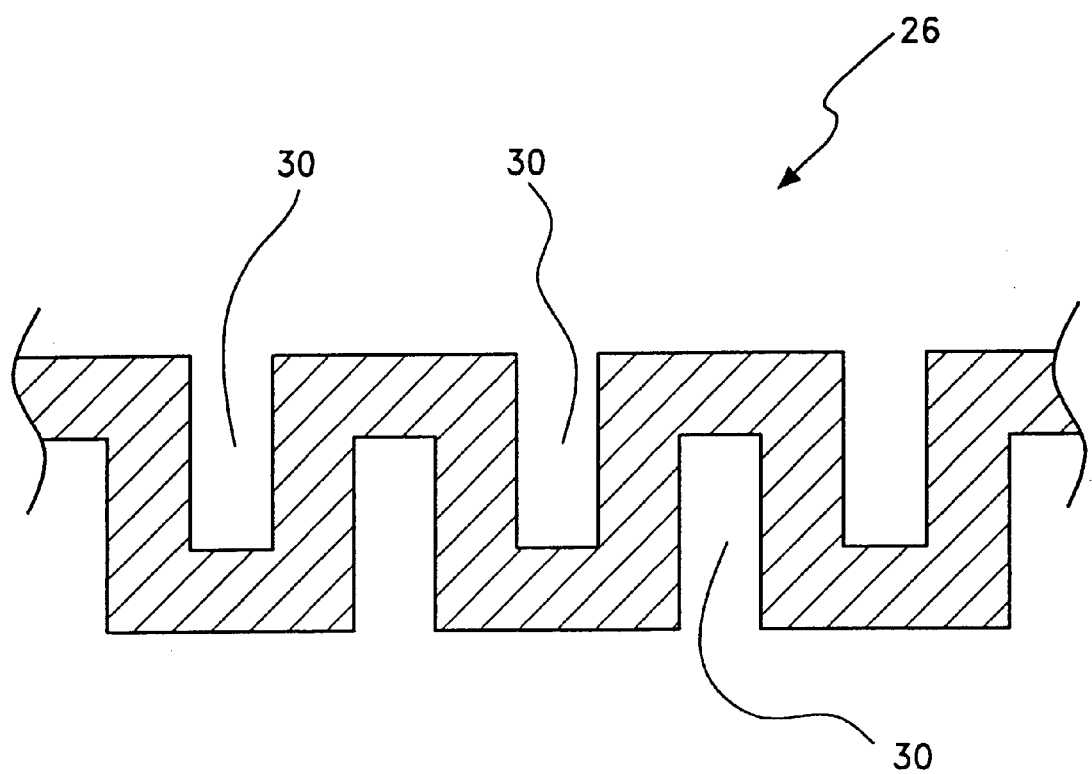
FIG. 3 is a cross section of one thinned wall portion of the single piece housing of FIG. 2.

In another embodiment, illustrated in FIG. 3, the thinned portions 22, 24 of the housing may be molded or machined to include notches 30 which may extend from one or both sides of the wall portion. If the notches extend from both sides, they may advantageously be positioned to alternate along the length of the thinned wall portion, and overlap in depth. These notches can improve flexibility of the thinned wall portions 22, 24, allowing freer movement of the central portion of the housing relative to the end portions. If desired, only portions of the thinned sections can be so notched to control the exact location of the deformation that occurs when the central region 16 is moved back and forth relative to the end portions 14a and 14b.

Figure 4:
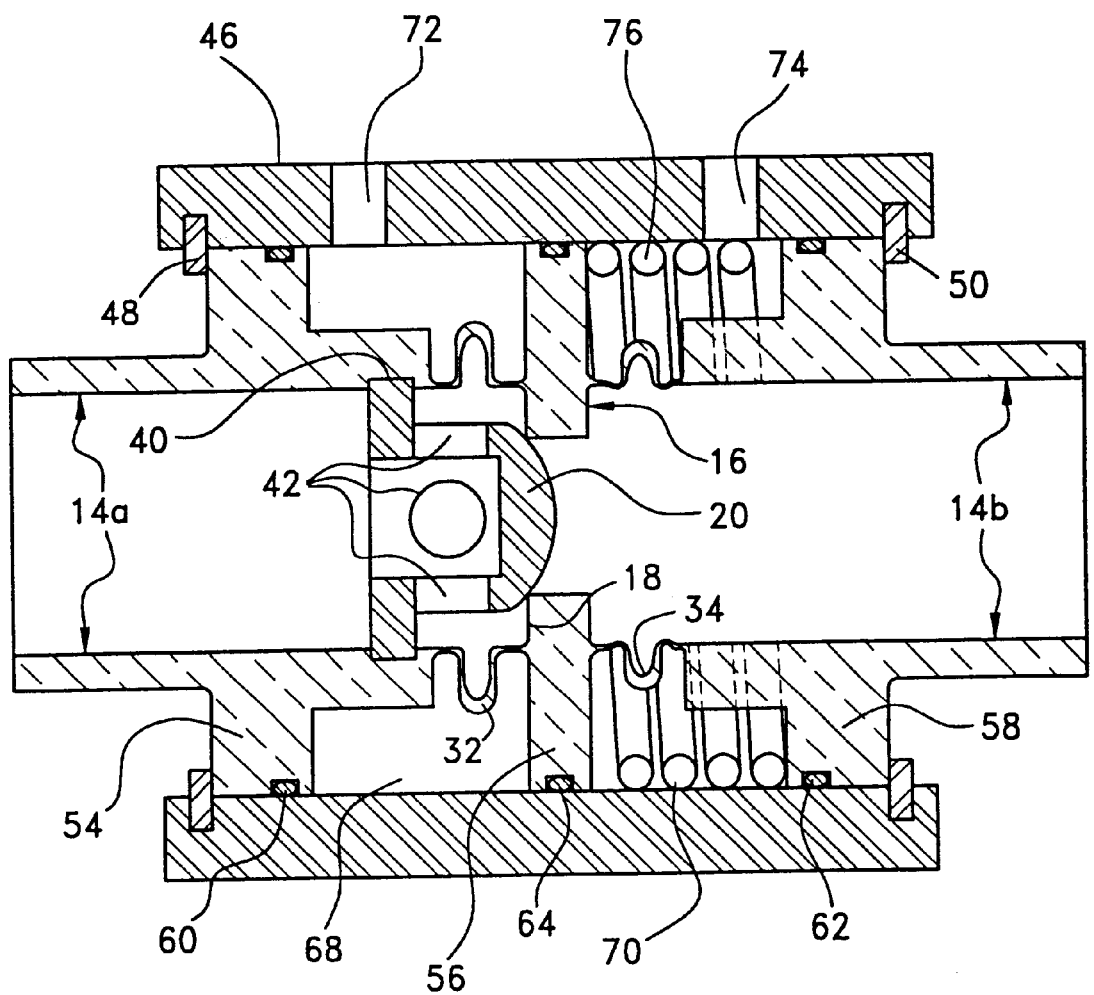
FIG. 4 is a longitudinal cross section of a valve in accordance with the invention.

FIG. 4 illustrates a cross sectional view of a valve embodiment incorporating a single piece housing having features similar to those illustrated in FIG. 2. In the embodiment of FIG. 4, the housing which defines the substantially linear fluid flow path again comprises end portions 14a, 14b and a central portion 16. Also included are a valve seat 18 and poppet 20, which are illustrated in FIG. 4 as being engaged, such that the valve of FIG. 4 is in the closed position. It will be appreciated that when the valve is in the open position, that is, when the valve seat 18 is moved rightward and is released from the poppet 20, fluid flow through the valve takes place without abrupt changes in direction which can cause turbulence in the flow. Thus, it easy to retain essentially laminar flow characteristics in the flowing fluid. Also, the valve design of FIG. 4 includes relatively little dead space in corners or cavities where fluid may collect and be retained.

Referring again to FIG. 4, the central portion 16 is coupled to the left end portion 14a by a deformable portion 32 of the housing. This deformable portion 32 comprises a thinned section of the sidewall formed into a single pleat or bellow. In some suitable valve embodiments, the thickness of the side wall in the deformable region 29 ranges from approximately 5 mil to approximately 50 mil. This thickness can vary widely depending on valve application.

The central portion 16 is also coupled to the right end portion 14b with a thinned section 34 of the housing side wall. This thinned section 34 may be formed with identical characteristics as those described above with reference to the other deformable section 32. It will be appreciated that the thinned sections may comprise more than one pleat, or may be machined in a variety of other deformable configurations which also allow relative movement of the central portion 16 of the housing relative to the end portions 14a, 14b of the housing.

For purposes of explanation, the central portion 16 of the housing can be considered to comprise two sections. One section comprises an inwardly extending flange which forms a valve seat 18. The second section comprises an outwardly extending flange 56 which is described in further detail below.

When the valve is in the closed position, as illustrated in FIG. 4, the valve seat 18 is engaged with the poppet 20. The poppet 20 is advantageously coupled to one of the end portions 14a, 14b. In the embodiment of FIG. 4, the poppet 20 is fixed to the left end portion 14a. The poppet 20 can be machined or molded as an integral part of the left end portion 14a. Alternatively, and as illustrated in FIG. 4, the poppet 20 may be a separate part which is secured to the left end 14a. In this case, the poppet 20 may be secured by a friction or press fit into a retaining groove 40 provided on the inside surface of the housing end portion 14a. The poppet 20 includes openings 42. These openings allow fluid flow through the poppet 20 and past the valve seat 18 when the valve seat 18 is moved to the right in FIG. 4 and is released from the poppet 20 such that the valve is in the open position.

The one piece housing is advantageously surrounded by a sleeve 46. As with the housing, the sleeve 46 may comprise a wide variety of materials, including metal, ceramic, plastic, glass, or others. A polypropylene plastic material has been found suitable in some embodiments. Both the end portions 14a, 14b, and the central portion 16 of the housing comprise flanges 54, 56, 58 which extend outward to the inner surface of the sleeve 46. Left end flange 54 is sealed in a substantially air tight manner against the inner surface of the sleeve 46 with an O-ring 60. Similarly, the right end flange 58 and central flange 56 are also sealed against the inner surface of the sleeve 46 with O-ring 62 and O-ring 64 respectively. During valve manufacture, the sleeve 46 is press fit over the housing flanges 54, 56, 58, and their associated O-rings 60, 64, 62. The sleeve is held in place by retaining rings 48, 50 which may be threaded into mating grooves on the inner surface of the sleeve 46 and the outer surface of the end portions 14a, 14b. This holds the end portions 14a and 14b in a fixed position relative to the sleeve 46 and relative to each other. The central portion of the housing 16, however, is free to slide back and forth relative to the stationary sleeve 46. As explained above, this motion causes differential deformation of the thinned regions 29, 31 on either side of the central region 16, and causes the engagement and release of the valve seat 18 from the poppet 20 to close and open the valve.

Between the central flange 56 and the left end flange 54 an air pocket 68 is formed around the thinned housing region 29. Similarly, between the central flange 56 and the right end flange 58 an air pocket 70 is formed around the thinned housing region 31. The open or closed state of the valve can be controlled by altering the relative air pressure between the two air pockets 68, 70. To accomplish this, the left air pocket 68 is provided with an air control port 72 and the right air pocket is provided with another air control port 74. One or both of these air control ports can be coupled to air supply sources having variable pressures so as to force the central flange 56 in a desired direction. In the embodiment of FIG. 4, a spring 76 is mounted between the central flange 56 and the right end flange 58 such that the valve seat 18 is biased toward the poppet 20. In this embodiment, the valve is normally closed when both air pockets are at ambient atmospheric pressure, and the right air control port 74 may be simply vented to the ambient air. To open the valve, an increased air pressure is applied to the left air control port 72, forcing the central flange 56 to compress the spring 76, and release the valve seat 18 from the poppet 20. During this operation, as the central region 16 moves rightward in FIG. 4, the left pleat 22 will deform by decreasing in height and increasing in width, and the right pleat 24 will deform by increasing in height and decreasing in width. It will be appreciated that a normally open valve can be produced by biasing the valve seat 18 rightward with a spring in the left air pocket 68. In this embodiment, the valve is closed with higher air pressure in the right air pocket 70.

Several variations on the valve of FIG. 4 are possible. For instance, the poppet 20 and the poppet engaging surface of the central flange 56 may be tapered to form a needle valve. In this case, precise flow rate control may be provided by controlling the location of the central flange 56 with varying air pressure at the air control ports 72 and 74. In another embodiment, the spring 76 may be weak enough to be compressed by the pressure of the fluid flowing from the left end of the valve. In this embodiment, a check valve is produced which allows flow from left to right, but not from right to left. In an alternative check valve embodiment, the poppet may be moveable with respect to the housing and spring biased to the right, such that it abuts the central flange 56 when the central flange 56 is placed in its rightmost position by a high air pressure in the left air control port 72. In this embodiment, a check valve which allows flow from right to left, but not left to right, is formed because to right to left flow forces the spring biased poppet to the left, away from the central flange 56. A filly closed valve position may also be obtained in this embodiment by altering the pressure at air control port 72 so as to allow the central flange 56 to move leftward to abut the poppet 20 and force it to the limit of its leftward travel. Thus, in the "open" position, a check valve is formed, and in the "closed" position, no flow in either direction is allowed.

Figure 5:
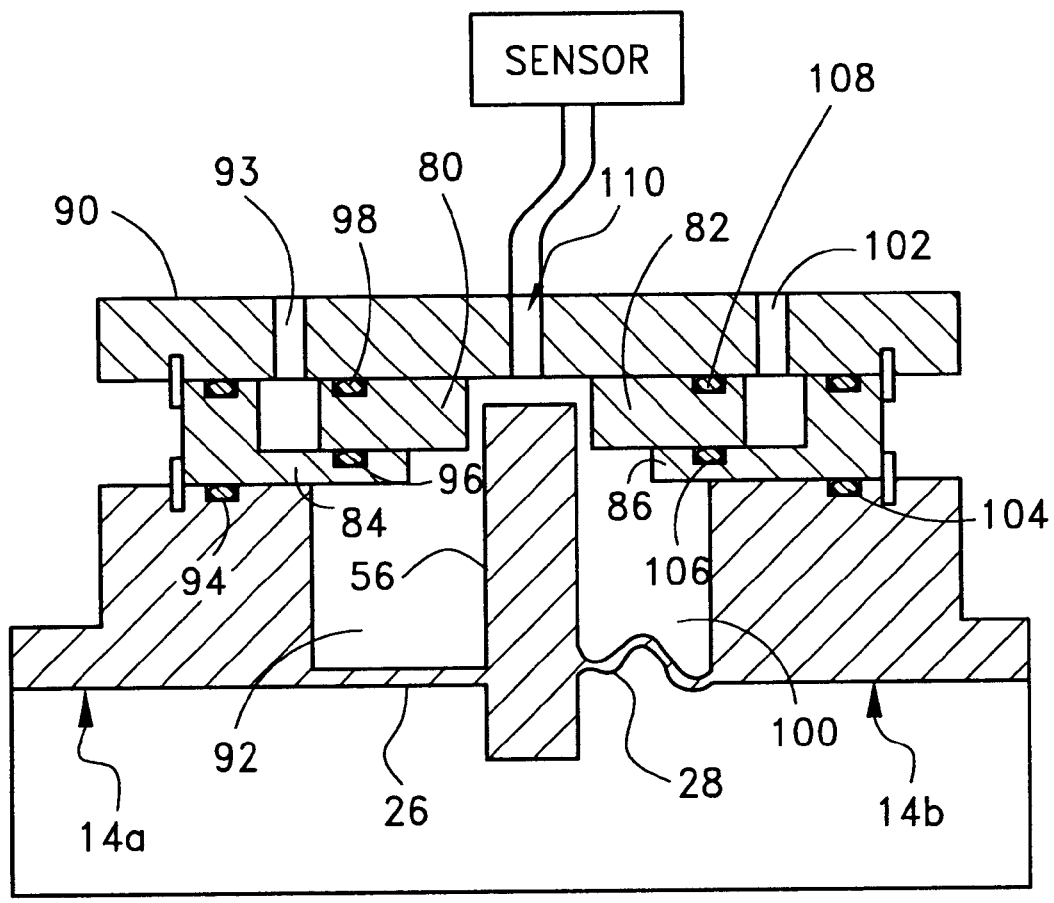
FIG. 5 is the upper half of a longitudinal cross section of a double sealed valve embodiment.

In some cases, it may be advantageous to seal the thinned regions 26, 28 of the housing from the outside surroundings. In these embodiments, leaks in the thinned portions may be more easily detected, and will not result in the entry of contaminants. One sealed embodiment is illustrated in FIG. 5, which shows an upper half cross section of a cylindrical valve. In this embodiment, two moveable annular pistons 80, 82 are sandwiched between inner sealing sleeves 84, 86 and an outer sleeve 90. This configuration allows the left air pocket 92 to be sealed from the external surroundings and the left air control port 93 with an O-ring 94 in the left housing portion 14a, an O-ring 96 in the left sealing sleeve 84, and an O-ring 98 in the left piston 80. Similarly, the right air pocket 100 is sealed from the external surroundings and the right air control port 102 with an O-ring 104 in the right housing portion 14b, an O-ring 106 in the right sealing sleeve 86, and an O-ring 108 in the right piston 82.

A high air pressure through the left air control port 93 will push the left piston 80 to the right, which in turn forces the central flange 56 to the right. Conversely, a high air pressure through the right air control port 102 will push the right piston 82 to the left, which in turn forces the central flange 56 to the left To equalize air pressure on both sides of the central flange 56, no seal is provided in the upper surface of the central flange 56 as in the embodiment of FIG. 4. If desired, an additional port 110 can be provided for routing to a leak detector so that if any leaks in the thinned wall portions 26, 28 occur, the leaking material can be routed out of the leak detection port 110 for sensing and corrective action.

In other embodiments, purely mechanical methods may be used to move the central flange 56. In one such embodiment, the central region 16 is forced back and forth by a mechanically, electrically, or electromagnetically actuated piston provided in one of the air pockets 68, 70. In some cases, the housing with the bellows may be completely open, omitting any external sleeve over the bellows and central flange 56 entirely.

Figure 6:
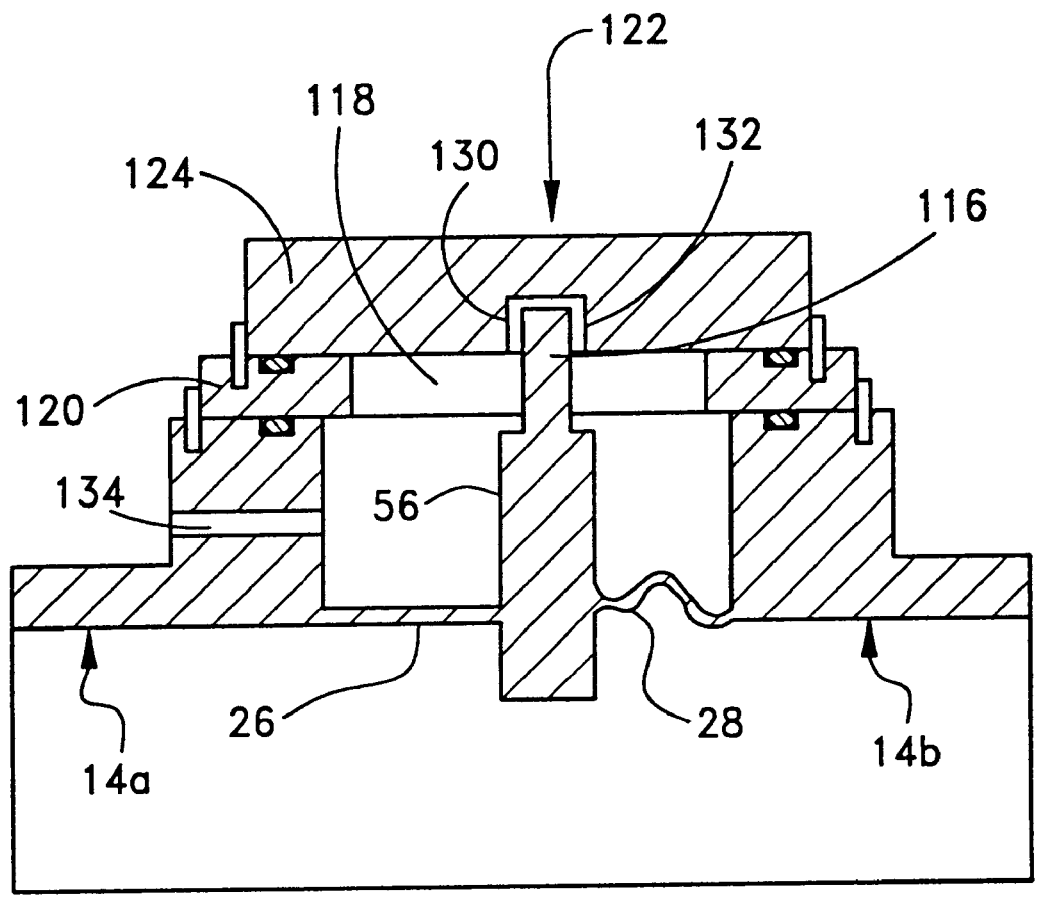
FIG. 6 is the upper half of a longitudinal cross section of a mechanically actuated valve embodiment.

An additional mechanically actuated valve is illustrated in FIG. 6, which also is an upper half cross section of a cylindrical valve. In this embodiment, the central flange 56 includes projecting pins 116. There may, for example, be three projecting pins placed 120 degrees apart around the circumference of the central flange 56, one of which is designated 116 in FIG. 6. Each pin 116 projects through a longitudinally extending slot 118 in an inner sleeve 120 and into a cam groove 122 on the inner surface of an outer sleeve 124. The slots 118 in the inner sleeve are only slightly wider than the diameter of the pins 116, and the cam grooves 122 are configured as spirals on the inside surface of the outer sleeve 124. Thus, when the outer sleeve 124 is rotated, either the left surface 130 or the right surface 132 of the cam grooves 122 will push against the pins 116 as the pins 116 are forced to follow the spiral configuration of the grooves 122. This will move the central flange 56 to the left or right, and open or close the valve. If desired, the cam grooves may include detents for releasably holding the pins 116 at one or more particular locations along the spiral groove contour so as to hold the valve in particular desired positions. In this embodiment, the thinned regions 26, 28 of the housing are also sealed off from the outside atmosphere, and thus a leak detection port 134 may be provided as described above with respect to the embodiment of FIG. 5.

Valves in accordance with the present invention thus allow control of a substantially linear fluid flow with simple and inexpensive parts and materials. Laminar flow through the valve with little or nor turbulence is easily maintained. Furthermore, the valves retain a small volume of the flowing fluid, and minimize low flow dead space which tends to collect precipitates or solid components of flowing slurries. The design can also be easily scaled up or down in size depending on the application. For large valves, for example, the valves may be made of metal, and the left, right, and central housing portions can be welded to separately fabricated deformable metal bellows portions.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A fluid flow valve comprising:

a one-piece housing defining a substantially linear fluid flow path, said one-piece housing having a central portion which is coupled on each side to a respective end portion by a deformable segment of said one-piece housing, each of said segments being deformable such that said central portion is moveable between said end portions along said substantially linear fluid flow path;

a poppet attached to one of said end portions and positioned in said substantially linear fluid flow path such that said central portion abuts said poppet to stop fluid flow through said valve when said central portion is moved toward said one of said end portions;

a first and second inner sealing sleeves, wherein said end portions of said housing are fixed relative to said inner sealing sleeves, and wherein said central portion of said housing is movable relative to said inner sealing sleeves; and an outer sleeve, substantially surrounding said housing and said inner sealing sleeves, wherein said outer sleeve is stationary with respect to said first and second inner sealing sleeves, and wherein said central portion of said housing is movable relative to said outer sleeve.

2. The valve in claim 1, wherein a sensing device is connected to have access to said air surrounding said deformable segments.

3. The fluid flow valve of claim 1, further comprising first and second moveable annular pistons positioned between said first and second inner sealing sleeves and said outer sealing sleeve.

4. A fluid flow valve comprising:

a one-piece housing defining a substantially linear fluid flow path, said one-piece housing having a central portion which is coupled on each side to a respective end portion by a deformable segment of said one-piece housing, each of said segments being deformable segment of said one-piece housing, each of said segments being deformable such that said central portion is moveable between said end portions along said substantially linear fluid flow path;

a poppet attached to one of the said end portions and positioned in said substantially linear fluid flow path such that said central portion abuts said poppet to stop fluid flow through said valve when said central portion is moved toward said one of said end portions;

a first and second inner sealing sleeves, wherein said end portions of said housing are fixed relative to said inner sealing sleeves, and wherein said central portion of said housing is movable relative to said inner sealing sleeves; and an outer sleeve surrounding said housing, wherein said inner sealing sleeves are fixed relative to said outer sleeve, and wherein said central portion of said housing is movable relative to said outer sleeve;

first and second moveable annular pistons, wherein an inner surface of each said moveale annular piston is sealed against an outer surface of each said inner sealing sleeve, and wherein an outer surface of each said moveable annular piston is sealed against an inner surface of said outer sleeve, thereby forming a first air pocket between said first inner sealing sleeve, said first moveable annular piston, and said outer sleeve, and also forming a second air pocket between said second inner sealing sleeve, said second moveable annular piston, and said outer sleeve, wherein the outer surface of each said end portions of said housing are sealed against an inner surface of each said inner sealing sleeve, and wherein said central portion of said housing comprises an outwardly extending flange, thereby forming a third air pocket between said first inner sealing sleeve, said first moveable annular piston, said first end portion of said housing, and said outwardly extending flange, and also forming a fourth air pocket between said second inner sealing sleeve, said second moveable annular piston, said second end portion of said housing, and said outwardly extending flange, whereby air in said third and fourth air pockets is substantially sealed from ambient conditions outside said outer sleeve.

5. The valve in claim 4, wherein a sensing device is connected to said outer sleeve having access to said air in said third and fourth air pockets.

6. The valve of claim 4, wherein said third and fourth air pockets are in communication with one another around said outwardly extending flange.

* * * * *

UNITED STATES PATENT AND TRADEMARK OFFICE
CERTIFICATE OF CORRECTION

PATENT NO.   : 6,453,932 B2
DATED        : September 24, 2002
INVENTOR(S)  : Scott E. Moore It is certified that error appears in the above-identified patent and that said Letters Patent is hereby corrected as shown below:

Title page,
Item [73], Assignee, should be -- Micron Technology, Inc. -- and not "Micron Technology, inc."

Column 3,
Line 66, incorrectly contains the word "comers" which should be -- corners --.

Column 5,
Line 46, incorrectly contains the word "filly" which should be -- fully --.

Column 7,
Line 44, incorrectly repeats the phrase "segment of said one-piece housing, each of said segments being deformable" after the phrase "each of said segments being deformable …".

Column 8,
Line 16, incorrectly contains the word "moveale" which should be -- moveable --.

Signed and Sealed this

Eighth Day of April, 2003

JAMES E. ROGAN
*Director of the United States Patent and Trademark Office*